US012662607B2

(12) United States Patent (10) Patent No.: US 12,662,607 B2
Winsberg et al. (45) Date of Patent: Jun. 23, 2026

(54) SILANE-BASED COATING COMPOSITION

(71) Applicant: BASF Coatings GmbH, Münster (DE)

(72) Inventors: Jan Winsberg, Münster (DE); Guenter Klein, Münster (DE); Elisabeth Wessling, Münster (DE); Karin Homann, Münster (DE); Stefanie Schroeder, Münster (DE); Ulrike Wenking, Münster (DE); Oliver Hilge, Münster (DE); Jan Zaminer, Münster (DE); Kristin Michel, Münster (DE); Peter Hoffmann, Münster (DE)

(73) Assignee: BASF COATINGS GMBH, Muenster (DE)

( * ) Notice: Subject to any disclaimer, the term of this patent is extended or adjusted under 35 U.S.C. 154(b) by 965 days.

(21) Appl. No.: 17/608,337

(22) PCT Filed: May 6, 2020

(86) PCT No.: PCT/EP2020/062594
§ 371 (c)(1),
(2) Date: Nov. 2, 2021

(87) PCT Pub. No.: WO2020/225310
PCT Pub. Date: Nov. 12, 2020

(65) Prior Publication Data
US 2022/0213346 A1 Jul. 7, 2022

(30) Foreign Application Priority Data
May 6, 2019 (EP) ..................................... 19172732

(51) Int. Cl.
| | |
|---|---|
| *C09D 175/04* | (2006.01) |
| *B05D 7/00* | (2006.01) |
| *C08G 18/10* | (2006.01) |
| *C08G 18/28* | (2006.01) |
| *C08G 18/73* | (2006.01) |
| *C08G 18/79* | (2006.01) |
| *C08G 77/18* | (2006.01) |
| *C08G 77/26* | (2006.01) |
| *C08K 5/5435* | (2006.01) |

(52) U.S. Cl.
CPC .............. *C09D 175/04* (2013.01); *B05D 7/53* (2013.01); *C08G 18/10* (2013.01); *C08G 18/289* (2013.01); *C08G 18/73* (2013.01); *C08G 18/798* (2013.01); *C08G 77/18*

(2013.01); *C08G 77/26* (2013.01); *C08K 5/5435* (2013.01); *B05D 2425/01* (2013.01); *C08G 2150/00* (2013.01)

(58) Field of Classification Search
None
See application file for complete search history.

(56) References Cited

U.S. PATENT DOCUMENTS

| | | | |
|---|---|---|---|
| 6,268,456 B1 | 7/2001 | Gregorovich et al. | |
| 11,466,157 B2 | 10/2022 | Yoshiyama | |
| 2008/0125529 A1 | 5/2008 | Austermann et al. | |
| 2008/0220173 A1* | 9/2008 | Poppe .................. | C09D 175/00 |
| | | | 427/407.1 |
| 2010/0028544 A1* | 2/2010 | Groenewolt ......... | C09D 175/04 |
| | | | 106/287.11 |
| 2012/0108730 A1* | 5/2012 | Zander ................... | C08G 77/46 |
| | | | 525/455 |
| 2013/0196072 A1 | 8/2013 | Groenewolt et al. | |
| 2016/0115351 A1 | 4/2016 | Iezzi | |
| 2017/0198084 A1 | 7/2017 | Holvoet et al. | |
| 2017/0218225 A1* | 8/2017 | Enkisch-Krug ...... | C09D 175/04 |
| 2020/0362173 A1* | 11/2020 | Yoshiyama .............. | C08K 5/56 |

FOREIGN PATENT DOCUMENTS

| | | |
|---|---|---|
| EP | 3505549 A1 | 7/2019 |
| GB | 1422884 A | 1/1976 |
| WO | 0198393 A1 | 12/2001 |

OTHER PUBLICATIONS

International Search Report and Written Opinion for corresponding PCT/EP2020/062594 mailed Sep. 16, 2020, 12 Pages.

* cited by examiner

*Primary Examiner* — Robert T Butcher
(74) *Attorney, Agent, or Firm* — Armstrong Teasdale LLP

(57) ABSTRACT

Described herein is a coating composition including one or more resins of formula R—[NH—CO—NR$^1$—R$^2$—Si(R$^a$)$_{3-x}$(R$^b$)$_x$]$_y$, one or more catalysts of formula [H$_3$C—C(R$^c$)(R$^d$)—C(=O)—O$^-$]$_z$M$^{z+}$ and one or more aprotic organic solvents. Also described herein are a method of coating a substrate with the above coating composition, a thus coated substrate, and a multilayer coating and a substrate coated with such multilayer coating.

16 Claims, No Drawings

SILANE-BASED COATING COMPOSITION

CROSS-REFERENCE TO RELATED APPLICATIONS

This application is a U.S. National Phase Application of International Patent Application No. PCT/EP2020/062594, filed May 6, 2020, which claims priority to European Patent Application No. 19172732.0, filed May 6, 2019, the entire contents of which are hereby incorporated by reference herein.

The present invention relates to silane-based coating compositions, particularly clearcoat compositions, a method of coating substrates with such coating compositions, thus coated substrates, multilayer coatings and thus coated substrates.

BACKGROUND

In today's clearcoat industry, the application of isocyanates as crosslinkers and tin catalysts becomes more and more undesired, because legal classifications and maximum permissible values are getting critical.

However, polyisocyanates are standard crosslinker materials in many coating systems, especially in clearcoats. Reasonable alternatives that fulfill future environmental, health and safety requirements, and also technological minimum requirements are not yet available. Furthermore, customers demand changes to fast low-temperature-curing coating systems.

All these requirements cannot be fulfilled with standard polyisocyanate crosslinked coatings. The utilization of alkoxy silane-containing materials for the formulation of clearcoats is a reasonable approach to address these points and replace polyisocyanates crosslinkers, since the condensation reaction of alkoxy silanes can be catalyzed tin-free and curing at ambient conditions is achievable.

However, coatings based solely on the condensation of alkoxy silanes show often unfavored properties like severe post curing and brittle films, which made them unsuitable as clearcoats in automotive applications. Especially, automotive refinish applications require tailormade clearcoats, due to the application of non-crosslinked basecoats.

Good performing alkoxy-silane-crosslinked clearcoats for automobile applications in general and particularly for refinish applications are not yet available, since important parameters like fast curing, quick sandability and polishability, good appearance, interlayer adhesion and resistance to humidity and UV irradiation were not yet available.

EP 2 641 925 A1 discloses coating compositions containing adducts of isocyanatoalkyl trialkoxysilanes with diols. These adducts were however used in the examples of EP 2 641 925 A1 together with high amounts of polyacrylate polyols. When used as sole resin with the catalysts of the present invention, these adducts show a comparably long tack free time and bad cross-cut adhesion, even before carrying out a constant climate test.

WO 03/054049 discloses isocyanato-functional silanes as adhesion promotors in polyurethane-based adhesives or coating materials. However, these silanes are isocyanate containing, which is to be avoided in the present invention.

JP-A-2005 015644 describes adducts of polyisocyanates with aminosilanes at an NCO to OH ratio from 1:0.05 to 1:0.9, i.e. with an excess of isocyanate groups. These adducts are used in curable resin compositions together with further resins.

It was the aim of the present invention to provide fast curing coating compositions based on silane crosslinking, which are apt to cure at low and high temperatures, without making use of isocyanate or aminoplast crosslinkers. The coating compositions should be particularly suitable in automotive coating such as automotive OEM and automotive refinish coating, preferably as clearcoat compositions. The coatings should also be solvent resistant, further exhibiting good adhesion, scratch resistance as well as UV and weathering resistance, good gloss and appearance. Furthermore, tin containing catalysts should not be needed.

SUMMARY

The above aim was achieved by providing a coating composition comprising (A) one or more resins of formula (I)

$$R\text{---}[NH\text{---}CO\text{---}NR^1\text{---}R^2\text{---}Si(R^a)_{3-x}(R^b)_x]_y \quad (I)$$

wherein

R is an aliphatic hydrocarbyl group, optionally containing one or more moieties selected from the group consisting of isocyanurate groups, uretdione groups, iminooxadiazinedione groups, allophanate groups and biuret groups;

$R^1$ is an alkyl group containing 1 to 10 carbon atoms, $R^2$ is an alkylene group containing 1 to 6 carbon atoms, $R^a$ is an alkoxy group containing 1 to 4 carbon atoms, $R^b$ is an alkyl group containing 1 to 4 carbon atoms or an alkoxy group containing 1 to 4 carbon atoms, x being 0 or 1, and y being 2 to 5;

(B) one or more catalysts of formula (II)

$$z[H_3C\text{---}C(R^c)(R^d)\text{---}C(\!=\!\!O)\text{---}O^-]M^{z+} \quad (II)$$

wherein $R^c$ and $R^d$ independently are hydrogen or alkyl groups containing 1 to 6 carbon atoms, with the proviso that the sum of the number of carbon atoms in residues $R^c$ and $R^d$ ranges from 2 to 7; and z=1 to 4; with the proviso that, if z=1, then M is selected from the group consisting of Li, K and Na;

if z=2, then M is selected from the group consisting of Zn and Zr;

if z=3, then M is selected from the group consisting of Bi and Al;

if z=4, then M is selected from the group consisting of Zr and Ti; and (C) one or more aprotic organic solvents.

The term "aliphatic" as used herein includes the term "cycloaliphatic" and refers to non-aromatic groups, moieties and compounds, respectively.

In the following the above coating composition is referred to as "coating composition according to the invention".

A further object of the present invention is a method of coating a substrate with the coating compositions according to the invention, the method comprising a. applying the coating composition according to the present invention onto a substrate to form a coating layer; and b. curing the coating layer at a temperature in the range from 10° C. to 180° C.

In the following the above method is referred to as "method according to the invention".

Another object of the present invention is a coated substrate obtainable according to the method according to the present invention.

Yet another object of the present invention is a multilayer coating comprising at least two coating layers, preferably at least one base coat layer and at least one clear coat layer, the clear coat layer being formed from the coating composition of the present invention. Further object is a thus coated substrate.

DETAILED DESCRIPTION

Coating Compositions

The coating compositions of the present invention at least comprise one or more resins (A) of formula (I), one or more catalysts of formula (II) and one or more aprotic solvents.

The coating compositions are preferably clearcoat compositions.

Resins (A)

The coating compositions of the present invention contain one or more resins of formula (I)

$$R\text{—}[NH\text{—}CO\text{—}NR^1\text{—}R^2\text{—}Si(R^a)_{3-x}(R^b)_x]_y \qquad (I)$$

wherein

R is an aliphatic hydrocarbyl group, optionally containing one or more moieties selected from the group consisting of isocyanurate groups, uretdione groups, iminooxadiazinedione groups, allophanate groups and biuret groups;

$R^1$ is an alkyl group containing 1 to 10 carbon atoms;

$R^2$ is an alkylene group containing 1 to 6 carbon atoms;

$R^a$ is an alkoxy group containing 1 to 4 carbon atoms;

$R^b$ is an alkyl group containing 1 to 4 carbon atoms or an alkoxy group containing 1 to 4 carbon atoms;

x being 0 or 1; and y being 2 to 5.

As indicated in the above formula (I) the resins of formula (I) do not contain isocyanate groups (NCO groups).

R is preferably a group derived from a diisocyanate or oligomers of such diisocyanates from which the isocyanate groups were formally subtracted. For example, R can be a hexamethylene group, which is formally a group derived from hexamethylene diisocyanate (HDI) from which the two isocyanate groups were formally subtracted. In another example, R can be a group $(CH_2)_6\text{—}N(CO)_2N\text{—}(CH_2)_6$, which is formally a group derived from an HDI dimer from which the two terminal isocyanate groups were formally subtracted. This group is an example for a hydrocarbyl group containing an uretdione group.

Preferred R groups, derivable from linear aliphatic diisocyanates in the above manner are e.g. ethylene, n-propylene, n-butylene, n-pentylene, n-hexylene (i.e. hexamethylene), n-heptylene, n-octylene, n-nonylene and n-decylene groups, and such R groups derivable from cycloaliphatic diisocyanates in the above manner are e.g. the cyclohexyl-$(CH_2)_6$-cyclohexyl group as derivable from 4,4'-diisocyanato-dicyclohexyl methane.

Further preferred R groups are those derivable from the dimers, e.g. uretdione dimers of the before-mentioned diisocyanates and trimers, e.g. isocyanurate trimers and iminooxadiazinedione trimers of the before-mentioned diisocyanates. Further suitable as R groups are those derivable from the biurets and allophanates of the before-mentioned diisocyanates.

It is also possible that R contains more than one group selected from isocyanurate groups, uretdione groups, iminooxadiazinedione groups, allophanate groups and biuret groups. Oligomers can also be formed from more than one type of diisocyanate, e.g. from HDI and isophorone diisocyanate (IPDI), in the same compound.

Preferably $R^1$ is an alkyl group containing 2 to 8 carbon atoms, even more preferred 4 to 6 carbon atoms, such as a butyl group.

Preferably $R^2$ is an alkylene group containing 1 to 3 carbon atoms, even more preferred 1 or 3, most preferred 3 carbon atoms.

Preferably $R^a$ is an alkoxy group containing 1 to 3 carbon atoms, even more preferred 1 or 2 carbon atoms and most preferred 1 carbon atom.

Preferably $R^b$ is a methyl group or an alkoxy group having 1 or 2 carbon atoms, even more preferred $R^b$ is an alkoxy group having 1 or 2 carbon atoms, most preferred x=0.

Preferably y=2 to 4.

The resins of formula (I) can easily be prepared by reacting diisocyanates (y=2) or polyisocyanates (y=3 to 5) of formula (Ia)

$$R\text{—}[NCO]_y \qquad (Ia)$$

with the respective amino silanes of formula (Ib)

$$HNR^1\text{—}R^2\text{—}Si(R^a)_{3-x}(R^b)_x \qquad (Ib)$$

R, $R^1$, $R^2$, $R^a$, $R^b$, x and y in formulas (Ia) and (Ib) are the same as defined in formula (I).

Preferred linear aliphatic diisocyanates of formula (Ia) are linear aliphatic diisocyanates of formula (Iaa)

$$OCN\text{—}(CH_2)_p\text{—}NCO \qquad (Iaa)$$

wherein p=2 to 10, more preferred 4 to 8 such as 6. Hexamethylene diisocyanate (HDI), p=6, being the most preferred linear aliphatic diisocyanate.

Preferred cycloaliphatic diisocyanates of formula (Ia) are 4,4'-diisocyanato dicyclohexylmethane ($H_{12}$MDI) and isophorone diisocyanate (IPDI), 4,4'-diisocyanato dicyclohexylmethane being the most preferred cycloaliphatic diisocyanate.

Preferred amino silanes of formula (Ib) are alpha-amino silanes ($R^2$=$CH_2$) and gamma-amino silanes ($R^2$=n-propyl), the gamma-amino silanes being most preferred in the present invention.

Any preferred definitions of $R^1$, $R^2$, $R^a$, $R^b$ and x for the compounds of formula (I) are likewise preferred for the amino silanes of formula (Ib). Particularly preferred are N-alkylamino-alkyl-trialkoxysilanes amongst which N-alkylamino-propyl trimethoxy silanes are most preferred such as n-butylamino-propyl-trimethoxysilane.

The preparation of compounds of formula (I) from compounds of formulas (Ia) and (Ib) can be carried out without solvent or in an aprotic solvent until all free isocyanate groups of the compound of formula (Ia) are consumed.

The amount of resin (A) in the coating composition, based on the total weight of the coating composition, is preferably from 25 to 95 wt.-%, more preferred 35 to 90 wt.-% and most preferred from 40 to 80 wt.-%. This amount of resin (A), which is employed in the coating composition, is the calculated theoretical amount of resin (A) based on the proviso that the sum of the weights of reactants employed in the manufacture of resin (A) equals the final weight of resin (A).

It is preferred that resin (A) and the catalysts (B1) and (B2) as described below are combined just before use of the coating composition to avoid pre-mature crosslinking, however, a storage stable one-component composition can also be realized if water traces are excluded from the composition till application.

Catalysts (B1)

The coating compositions of the present invention contain one or more catalysts (B), also denoted herein as catalysts (B1), of formula (II)

$$z[H_3C—C(R^c)(R^d)—C(=O)—O^-]M^{z+} \qquad (II)$$

wherein $R^c$ and $R^d$ independently are hydrogen or alkyl groups containing 1 to 6 carbon atoms, with the proviso that the sum of the number of carbon atoms in residues $R^c$ and $R^d$ ranges from 2 to 7; and z=1 to 4; with the proviso that, if z=1, then M is selected from the group consisting of Li, K and Na;

if z=2, then M is selected from the group consisting of Zn and Zr;

if z=3, then M is selected from the group consisting of Bi and Al; and if z=4, then M is selected from the group consisting of Zr and Ti.

Preferably the sum of the number of carbon atoms in residues $R^c$ and $R^d$ ranges from 5 to 7.

Preferably z=1 or 3, most preferred z=1.

The most preferred catalysts (B1) are the alkali metal salts of neodecanoic acid and 2-ethyl hexanoic acid, such as potassium neodecanoate. Most preferred M=K or Li, even more preferred potassium.

Often, the catalysts of formula (II) are supplied by manufacturers in acid stabilized form. It is preferred to use such acid-stabilized catalysts of formula (II), not only because of their higher storage stability, but also because they introduce free acid into the coating composition according to the present invention. Such acids are known to be beneficial in combination with the catalysts (B2). The stabilizing acid is generally the same as the branched free carboxylic acid which corresponds to the catalyst of formula (II).

If the supply form of the catalyst contains $H_3C—C(R^c)$ $(R^d)—C(=O)—OH$, the content of this acid is subsumed under the carboxylic acids (D) of formula (III) as described below.

The amount of catalyst (B1), based on the amount of resin (A) of the coating composition preferably ranges from 1 mmol to 50 mmol, more preferred from 5 mmol to 40 mmol and most preferred from 15 to 25 mmol metal per 100 g resin (A) solid.

Catalyst (B2)

Preferably the coating composition further contains a catalyst (B2) selected from the group of bicyclic tertiary amines. Most preferred bicyclic tertiary amines are 1,5-diaza-bicyclo[4.3.0]non-5-ene (hereinafter referred to as DBN), 1,5-diaza-bicyclo(4,4,0)decene-5 (hereinafter referred to as DBD) or 1,8-diaza-bicyclo[5.4.0]undec-7-ene (herein referred to as DBU) and 1,4-diazabicyclo[2.2.2] octane (herein referred to as DABCO). Among them, DBU and DBN are preferred. Particularly preferred is DBU. Such bicyclic tertiary amines may be used alone, or two or more of them may be used in combination.

The use of such catalysts (B2) in the coating compositions of the present invention without catalysts (B1) leads to coatings having insufficient adhesion and are therefore not suitable in the envisaged fields of application.

However, in combination with catalysts (B1) adhesion compared to the sole use of catalysts (B1) can be further improved. Therefore, a combination of catalysts (B1) with catalysts (B2) is typically preferred.

The weight ratio of catalysts (B1) to catalysts (B2) is preferably from 1:1 to 8:1, more preferred from 2:1 to 6:1 and most preferred from 3:1 to 5:1 such as 4:1.

Aprotic Organic Solvents (C)

The coating compositions according to the present invention contain one or more aprotic solvents. The aprotic solvents in the coating composition are chemically inert toward resin (A), i.e. they do not react with resin (A) when the coating composition is cured.

Examples of such solvents are aliphatic and/or aromatic hydrocarbons, such as toluene, xylene, solvent naphtha, Solvesso 100 or Hydrosol® (from APAL), ketones, such as acetone, methyl ethyl ketone or methyl amyl ketone, esters, such as ethyl acetate, butyl acetate, pentyl acetate or ethyl epoxypropionate, ethers, or mixtures of the afore-mentioned solvents. The aprotic solvents or solvent mixtures preferably have a water content of not more than 1% by weight, more preferably not more than 0.5% by weight, based on the solvent.

The coating compositions according to the present invention are preferably substantially water-free and free from protic organic solvents (less than 10 wt.-%, preferably less than 5 wt.-% of water and/or protic organic solvents, based on the total weight of the coating composition). However, some additives or catalysts used herein are sold in protic organic solvents, therefore, in some cases, it cannot be avoided to introduce some unwanted protic solvents, unless a solvent exchange is carried out before their use. If the amount of such protic solvents is kept in the above limits, such amounts can typically be neglected. If undesired premature crosslinking occurs due to the presence of protic solvents, e.g. introduced by additives, such additives are preferably introduced into the coating composition just prior to the application of the coating composition. Another possibility is to perform a solvent-exchange.

The aprotic solvents are typically introduced by using a solution or dispersion of resin (A) in an aprotic solvent or mixtures of aprotic solvents. Further parts of the aprotic solvent(s) are introduced to adjust the viscosity of the coating composition to a suitable application viscosity.

The amount of aprotic solvents (C), based on the total weight of the coating composition, is preferably from 1 to 70 wt.-%, more preferred 20 to 60 wt.-% and most preferred from 30 to 50 wt.-%.

Carboxylic Acid (D)

The coating compositions of the present invention preferably contains one or more carboxylic acids of formula (III)

$$H_3C—C(R^e)(R^f)—C(=O)—OH \qquad (III)$$

wherein $R^e$ and $R^f$ independently are hydrogen or alkyl groups containing 1 to 6 carbon atoms, with the proviso that the sum of the number of carbon atoms in residues $R^e$ and $R^f$ ranges from 2 to 7.

Particularly preferred the carboxylic acid of formula (III) is the free carboxylic acid which corresponds to the carboxylate anion of the catalyst of formula (II). Most preferred the carboxylic acid (D) is introduced by using acid stabilized catalysts (B1).

The amount of carboxylic acids (D), based on the total weight of the catalyst (B1), is preferably from 0 to 80 wt.-%, more preferred 30 to 70 wt.-% and most preferred from 50 to 60 wt.-%.

Epoxy Functional Compound (E)

Preferably the coating compositions of the present invention further comprise one or more epoxy functional compounds (E) of formula (IV)

$$(X)_n\text{—}R^3\text{—}Ox \qquad\qquad (IV)$$

wherein Ox is an oxirane group; $R^3$ is an aliphatic hydrocarbyl group containing 2 to 15 carbon atoms and optionally comprising ether groups and/or ester groups; n=1 to 5; and the n X groups are independently of each other Ox or —Si($R^g$)$_{3-v}$($R^h$)$_v$, wherein v=0 or 1, $R^g$ is an alkoxy group containing 1 to 4 carbon atoms, and $R^h$ is an alkyl group containing 1 to 4 carbon atoms or an alkoxy group containing 1 to 4 carbon atoms.

Preferably the epoxy functional compound (E) is selected from aliphatic glycidyl ethers, aliphatic glycidyl esters (the terms include cycloaliphatic glycidyl ethers and cycloaliphatic glycidyl esters), carrying n X groups.

In case the n X groups are oxirane groups, the compounds of formula (IV) are aliphatic diglycidyl ethers, aliphatic polyglycidyl ethers, aliphatic diglycidyl esters and/or aliphatic polygylcidyl esters.

Examples of aliphatic di- or polyglycidyl ethers are 1,4-butanediol-diglycidylether (Heloxy 67), 1,6-hexanediol-diglycidylether (Heloxy modifier HD), trimethyolpropane triglycidylether (Heloxy 48), and neopentylglycol diglycidylether (Heloxy 68), hydrogenated bisphenol A diglycidyl ethers (for example sold under the trade name Epalloy 5000 and Epalloy 5001 from CVC Specialty Chemicals; or YX8000 from Japanese Epoxy Resins Co. Ltd.), cyclohexanedimethylol diglycidylether (for example sold under the trade name Heloxy 107 from Hexion), tricyclodecane dimethanol diglycidylether (for example sold under the trade name EP4088S from Adeka), compound synthesized from 1,3-propanediol, 2,2-bis(hydroxymethyl)-, polymer with 2-(chloromethyl)oxirane (Basocoll OV) or glycerol diglycidylether.

Examples of aliphatic di- or polyglycidyl esters include glycidyl ester of linoleic acid dimer (for example sold under the trade name Erisys GS-120 from CVC Specialty Chemicals), dimer acid diglycidyl ester (for example sold under the trade name Heloxy Modifier 71 from Hexion), and diglycidyl 1,2-cyclohexanedicarboxylate (for example sold under the trade name Epalloy 5200 from CVC Specialty Chemicals).

In case at least one of the n X groups is a —Si($R^g$)$_{3-v}$($R^h$)$_v$ group, the compounds of formula (IV) are epoxy silanes such as glycidoxyalkyl dialkoxyalkylsilanes and glycidoxyalkyl trialkoxysilanes. A preferred epoxy silane compound is, e.g. glycidoxypropyl trimethoxysilane, dimethoxy(3-glycidyloxypropyl)methylsilane and 2-(3,4-epoxycyclohexyl) ethyltrimethoxysilane.

The amount of the epoxy functional compound (E), based on the solids content of the coating composition, is preferably from 0 to 20 wt.-%, more preferred 2.5 to 15 wt.-% and most preferred from 5 to 10 wt.-%.

The solids content of the coating composition is determined by drying approximately 1 gram of the coating composition at 130° C. for 60 min.

If an epoxy silane is used as epoxy functional compound (E), it is preferred that (E) is pre-mixed with resin (A) and the catalysts (B1) and (B2) as described above are combined with (A) and (E) just before use of the coating composition to avoid pre-mature crosslinking, however, a storage stable one-component composition can also be realized if water traces can be excluded from the composition until application.

Additives (F)

The coating composition of the invention may further comprise at least one customary and known coatings additive in typical amounts, i.e., in amounts preferably from 0 to 20 wt.-%, more preferably from 0.005 to 15 wt.-% and particularly from 0.01 to 10 wt.-%, based in each case on the total weight of the coating composition. The before-mentioned weight-percentage ranges apply for the sum of all additives likewise.

Examples of suitable coatings additives are UV absorbers; light stabilizers such as HALS compounds, benzotriazoles or oxalanilides; rheology modifiers such as sagging control agents (urea crystal modified resins); free-radical scavengers; slip additives; polymerization inhibitors; defoamers; wetting agents; fluorine compounds; adhesion promoters; leveling agents; film-forming auxiliaries such as cellulose derivatives; fillers, such as nanoparticles based on silica, alumina or zirconium oxide; for further details refer to Römpp Lexikon "Lacke and Druckfarben", George Thieme Verlag, Stuttgart, 1998, pages 250 to 252; rheology control additives such as those from patents WO 94/22968, EP-A-0 276 501, EP-A-0 249 201 or WO 97/12945; crosslinked polymeric micro-particles, as disclosed for example in EP-A-0 008 127; inorganic phyllosilicates such as aluminum magnesium silicates, sodium magnesium and sodium magnesium fluorine lithium phyllosilicates of the montmorillonite type; silicas such as Aerosils®; organic thickeners; and/or flame retardants.

Amongst the above additives, the most preferred additives are UV absorbers being preferably present in an amount from 0.25 to 2.5 wt.-%, light stabilizers being preferably present in an amount from 0.25 to 2.5 wt.-% and leveling agents being preferably present in an amount from 0.25 to 2.5 wt.-%, the ranges being based on the total weight of the coating composition.

It is possible, but not desired, that the coating composition further contains binders which differ from the ingredients (A) to (F). However, such binders, if present at all, are contained in the coating composition according to the present invention in amounts preferably less than 10 wt.-% and more preferred less than 5 wt.-%, based on the weight of resin (A) present in the coating composition of the present invention. It is particularly preferred, that, if present at all, hydroxy-functional polysiloxanes and/or alkoxy-functional polysiloxanes are contained in the coating composition according to the present invention in amounts preferably less than 10 wt.-% and more preferred less than 5 wt.-%, or even more preferred less than 3 wt.-% based on the weight of resin (A) present in the coating composition of the present invention. Most preferred the coating composition of the present invention is free from hydroxy-functional polysiloxanes and/or alkoxy-functional polysiloxanes.

The additives can comprise further catalysts, which are different from catalysts (B1) and (B2), even catalysts such as tin containing catalysts. However, since there is no need for tin containing catalysts in the coating compositions of the present invention, it is preferred that no tin containing catalysts are contained and it is also preferred that no catalysts beside catalysts (B1) and (B2) are contained in the coating compositions of the present invention.

The coating compositions do most preferably not contain species containing free isocyanate groups, even more preferred they do not contain species with free isocyanate groups and species with blocked isocyanate groups. Preferably the coating compositions of the present invention do not contain any crosslinking agents selected from the group consisting of amino resins, free polyisocyanates and blocked polyisocyanates. In the present invention the moieties selected from the group consisting of isocyanurate groups, uretdione groups, iminooxadiazinedione groups, allophanate groups and biuret groups are not subsumed under the definition of blocked isocyanates.

Method of Coating a Substrate

Further object of the present invention is a method of coating a substrate with the coating compositions according to the invention, the method comprising applying the coating composition according to the present invention onto a substrate to form a coating layer and curing the coating layer at a temperature in the range from 10° C. to 180° C.

Substrates

In the method of the present invention a wide variety of materials can be used as substrates. Preferably the substrate materials are chosen from the group consisting of metals, polymers, wood, glass, mineral-based materials and composites of any of the afore-mentioned materials.

The term metal comprises metallic elements like iron, aluminum, zinc, copper and the like as well as alloys such as steel like cold-rolled steel, galvanized steel and the like. Polymers can be thermoplastic, duroplastic or elastomeric polymers, duroplastic and thermoplastic polymers being preferred. Mineral-based materials encompass materials such as e.g. hardened cement and concrete. Composite materials are e.g. fiber-reinforced polymers etc.

Of course, it is possible to use pre-treated substrates, where the pre-treatment regularly depends on the chemical nature of the substrate.

Preferably, the substrates are cleaned before use, e.g. to remove dust, fats, oils or other substances which typically prevent a good adhesion of coatings. The substrate can further be treated with adhesion promoters to increase the adhesion of subsequent coatings.

Metallic substrates may comprise a so-called conversion coat layer and/or electrodeposition coat layer before being coated with the coating composition according to the present invention. This is particularly the case for substrates in the automotive coating field such as automotive OEM and automotive refinish coating.

For polymeric substrates pretreatment may include, for example, treatment with fluorine, or a plasma, corona or flame treatment. Often the surface is also sanded and/or polished. The cleaning can also be done manually by wiping with solvents with or without previous grinding or by means of common automated procedures, such as carbon dioxide cleaning.

Any of the above substrates can also be pre-coated with one or more fillers and/or one or more basecoats prior to the formation of the coating layer. Such fillers and basecoats may contain color pigments and/or effect pigments such as metallic effect pigments as e.g. aluminum pigments; or pearlescent pigments as e.g. mica pigments. This is particularly the case for substrates in the automotive coating field such as automotive OEM and automotive refinish coating.

Application

The coating composition of the invention can be applied by any of the customary application methods, such as spraying, knife coating, brushing, flow coating, dipping, impregnating, trickling or rolling, for example. The substrate to be coated may itself be stationary, with the application equipment or unit being in motion. Alternatively, the substrate to be coated, especially a coil, may be in motion, with the application unit being stationary relative to the substrate or being in appropriate motion.

On industrial scale, it is preferred to employ spray application methods, such as compressed-air spraying, airless spraying, high-speed rotation, or electrostatic spray application (ESTA).

Curing

Curing of the coating layer may take place after a certain rest time. This rest time is used, for example, for the leveling and degassing of the coating films or for the evaporation of solvents. The rest time may be assisted and/or shortened by application of elevated temperatures, if this does not entail any damage or change to the coating films, such as premature complete crosslinking.

The curing of the coating compositions has no particular features as far as its method is concerned, but instead takes place in accordance with the conventional methods such as heating in a forced-air oven or exposure to IR lamps. Curing may also take place in stages. Another preferred curing method is that of curing with near infrared (NIR) radiation. Curing takes place at a temperature of 10 to 180° C., preferably 20 to 150° C. and more preferably 20 to 140° C. or most preferably 20 to 70° C., for a time of 2 min to 2 h, more preferably 3 min to 1 h and particularly 5 min to 30 min. Relative humidity should preferably be in the range from 20% to 90%. If the relative humidity drops below 20% curing may become too slow.

The coating compositions of the invention provide new cured coatings, which quickly cure, especially clear coats, moldings, especially optical moldings, and self-supporting sheets. The cured coatings show good adhesion, fast sandability and polishability, a good appearance and scratch and solvent resistance, and particularly a good performance in the CAM 180 test. The coatings and coating systems of the invention, especially the clear coats, can also be produced particularly in coat thicknesses >40 μm without incidence of stress cracks. Typically layer thicknesses range from 15 μm to 80 μm, preferably 20 μm to 70 μm or 30 μm to 65 μm such as 40 μm to 60 μm.

Coated Substrates

Further object of the present invention are coated substrates, which are obtainable by the method according to the invention.

Depending on the substrate material chosen, the coating compositions can be applied in a wide variety of different application areas. Many kinds of substrates can be coated. The coating compositions of the invention are therefore outstandingly suitable for use as decorative and protective coating systems, particularly for bodies of means of transport (especially motor vehicles, such as motorcycles, buses, trucks or automobiles) or parts thereof. The substrates preferably comprise a multilayer coating as used in automotive coating.

The coating compositions of the invention are also suitable for use on constructions, interior and exterior; on furniture, windows and doors; on plastics moldings, especially CDs and windows; on small industrial parts, on coils, containers, and packaging; on white goods; on sheets; on optical, electrical and mechanical components, and on hollow glassware and articles of everyday use.

Multilayer Coatings and Multilayer-Coated Substrates

Yet another object of the present invention is a multilayer coating consisting of at least two coating layers, at least one of which is formed from a coating composition according to the present invention Typically, the multilayer coating comprises more than two coating layers.

A preferred multilayer coating comprises at least a base coat layer and a clear coat layer. The coating compositions of the present invention preferably form the clear coat layer.

Even more preferred is a multilayer coating comprising at least one filler coat layer, coated with at least one base coat layer, which again is coated with at least one clear coat layer, the clear coat layer preferably being formed from the coating compositions of the present invention.

Particularly, but not limited to automotive coating a multilayer coating preferably comprises an electro coat layer, at least one filler coat layer on top of the electro coat layer, coated with at least one base coat layer, which again is coated with at least one clear coat layer, the clear coat layer preferably being formed from the coating compositions of the present invention.

The above multilayer coatings can be applied to any of the substrates named above, typically, but not limited to pre-treated substrates. Therefore, another object of the present invention is a multilayer-coated substrate, coated with any of the above multilayer coatings.

In the following examples section, the present invention will be further explained.

Examples

Preparation of Silanized Resins

Resin 1

Resin 1 was prepared by reacting 26.30 g hexamethylene diisocyanate (HDI, monomer) with two equivalents N-(n-butyl)-3-aminopropyltrimethoxysilane (73.70 g) at 60° C. without solvents until the remaining NCO content reached 0%.

Resin 2

Resin 2 was prepared in the same manner as resin 1, however instead of HDI, an HDI-based uretdione (35.59 g, DESMODUR XP2840) was reacted with three equivalents N-(n-butyl)-3-aminopropyltrimethoxysilane (44.41 g) in 20 g butyl acetate at 60° C. until the remaining NCO content reached 0%.

Resin 3

Resin 3 was prepared in the same manner as resin 1, however instead of HDI, an HDI-trimer (35.84 g, Desmodur N3300) was reacted with three and a half equivalents N-(n-butyl)-3-aminopropyltrimethoxysilane (44.16 g) in 20 g butyl acetate at 60° C. until the remaining NCO content reached 0%.

Resin 4

Resin 4 was prepared in the same manner as resin 1, however instead of HDI, 4,4'-methylene bis(cyclohexyl iso-cyanate) (28.60 g, Desmodur W) was reacted with two equivalents N-(n-butyl)-3-aminopropyltrimethoxysilane (51.40 g) in 20 g butyl acetate at 60° C. until the remaining NCO content reached 0%.

Resin A (EP 2 641 925 A1)

Resin A was prepared in without solvents by reacting 21.78 g 1,6-Hexanediol with two equivalents 3-(trimethox-ysilyl)propyl isocyanate (78.01 g) and 0.22 g DBTL was used as catalyst at 60° C.

Inventive Coating Compositions 1 to 7 and Comparative Coating Compositions A and B The ingredients of the Inventive Coatings Compositions 1 to 7 of the present invention and the ingredients of Comparative Coating Composition A were mixed in the amounts shown in Table 1. First ingredients I were mixed and afterwards pre-mixed ingredients II were added. All amounts are in parts by weight (i.e. in gram).

TABLE 1

| | | | Coating Compositions | | | | | | | | |
|---|---|---|---|---|---|---|---|---|---|---|---|
| | | NVC*** | | | | | Coating Compositions | | | | |
| | Ingredients | % | 1 | 2 | 3 | 4 | 5 | 6 | 7 | A* | B** |
| I | Butylacetate | 0 | 39.85 | 42.15 | 40.55 | 28.25 | 28.05 | 27.6 | 29.65 | 39.65 | 44.12 |
| | Leveling additive | 10 | 1 | 1 | 1 | 1 | 1 | 1 | 1 | 1 | 1 |
| | K-neodecanoate/ free neodecanoic acid (44/56 w/w) | 70 | 6.05 | 6.1 | 11.4 | 6.05 | 6.55 | 6.55 | 5.98 | 6.55 | — |
| | DBU | 100 | 0.5 | 0.5 | — | 0.5 | 0.5 | 0.5 | 0.5 | 0.5 | 0.28 |
| | HALS | 20 | 2.9 | 0 | | 2.9 | 2.9 | 2.9 | 2.9 | 2.9 | |
| | UV-Absorber 1 | 85 | 0.9 | 0 | | 0.9 | 0.9 | 0.9 | 0.9 | 0.9 | |
| | UV-Absorber 2 | 100 | | 0.6 | 0.55 | | | | | | |
| | UV-Absorber 3 | 95 | | 0.8 | 0.8 | | | | | | |
| II | Resin 1 | 100 | 44.4 | 48.8 | 45.7 | | | | | | 54.6 |
| | Resin 2 | 79.1 | | | | 55.5 | | | | | |
| | Resin 3 | 80.7 | | | | | 60.1 | | | | |
| | Resin 4 | 80.1 | | | | | | 60.55 | 57.0 | | |
| | Resin A* | 100 | | | | | | | | 48.5 | |
| | Glycidyloxypropyl-trimethoxysilane | 100 | 4.4 | | | 4.9 | | | 3.4 | | |
| | sum/g | | 100 | 100 | 100 | 100 | 100 | 100 | 100 | 100 | 100 |
| | nonvolatile content/% | | 55 | 55 | 55 | 55 | 55 | 55 | 55 | 55 | 55 |

*Comparative Resin/Example according to EP 2 641 925 A1

**no metal salt of carboxylic acid

***NVC = non-volatile content, materials featuring an NVC < 100% were dissolved/diluted in butyl acetate Application of the Coatings in a Refinish-Built-Up Steel panels were pretreated, electrodeposition coated, coated with a primer and a basecoat and subsequently coated with the coating compositions of the invention and the comparative coating composition, respectively, as described below.

Pretreatment

Steel panels were first pretreated with Gardobond® R zinc phosphatation (commercially available from Chemetall GmbH).

Electrode Position Coating

Afterwards, the pretreated steel panels were coated with an electrodeposition coating (ED coating) (Cathogard® 800, commercially available from BASF Coatings GmbH).

Primer Coating

Afterwards, these ED-coated panels were spray coated with a primer (Glasurit® 285-230), cured at 60° C., and subsequently sanded.

Basecoat Coating

A waterborne basecoat was applied (Glasurit Line 90-1250 Deep Black) next, followed by a flash-off at ambient conditions till the basecoat layer was touch dry.

Coating with the Inventive Coating Compositions 1 to 7 or Comparative Coating Compositions A and B In the next step one of the clearcoat compositions 1 to 7 or A and B was applied and the curing occurred again at ambient conditions. All compositions formed proper films on the dried basecoat.

The silane-based clearcoat can be cured either with a base (composition B), a metal carboxylate (composition 3) or a mixture thereof (composition 2). Curing times are in the range of 30 to 60 minutes.

TABLE 1

| Layer thicknesses of the respective clear coatings. | | | | | | | | | |
|---|---|---|---|---|---|---|---|---|---|
| | Clearcoat from Coating compositions | | | | | | | | |
| | 1 | 2 | 3 | 4 | 5 | 6 | 7 | A | B |
| Layer thickness/μm | 30 | 36 | 33 | 49 | 61 | 60 | 54 | 35 | 30 |

Testing of Coatings Obtained from Coating Compositions 1 to 7 and from Comparative Coating Compositions A and B The inventive and comparative coating from coating compositions 1 to 7 and A and B, respectively, were tested for their touch dry times, solvent resistance (xylene test) adhesion (cross-cut tests with or without constant climate test), appearance, the time to become sandable/polishable, their scratch resistance (Crockmeter test) and their weathering resistance (WOM CAM 180 test).

The respective tests are described below in more detail.

Tack Free Time

The tack free time is determined by the Guillotine test according to DIN EN ISO 9117-5. For this test 1.5 g of sea sand is poured on the clear coat. The excess of sand is poured off from the panel. Afterwards, the panel is transferred to a device (Guillotine) that allows to drop the panel from 30 cm above the surface in a self-falling guided manner. The panel drops with the edge on the surface and is afterwards checked for remaining grains of sand. Remain no grains of sand on the coating surface the Guillotine test is considered OK and the coating "tack free".

Xylene Test

Seven days after application of the coating a large drop (around 2 mL) of Xylene is applied on the coating and again removed after 4 minutes. One hour later the surface is cleaned with PK700 cleanser (available from R-M Automotive Refinish Paints) and the coating is examined. The visibility of the edge of the drop is measured in the range 0 to 5 (where 0 means no visible ring and 5 complete removal of the clear coat)

Cross-Cut Adhesion

Cross-cut adhesion was performed according to DIN EN ISO 2409 EN.

Sandability Test

The clear coat is wettened with a small amount of deionized water and then sanded with 3M P1500/P2000 and 3M Finesse-it Trizact 50079 sanding papers. As soon as the sanding tool slides smoothly over the clear coat surface the coating is considered sandable and the time is noted.

Polishability Test

After the sandability of the clear coat is given the polishability is tested. The sanded areas are first polished with 3M™ Perfect-it III Schleifpaste Plus (PN50417) and the corresponding pad and afterwards polished with 3M™ Perfect-It™ III Extra Fine Schleifpaste and the corresponding pad. The coating is considered polishable when the sanding paste is not sticking to the clearcoat and a smooth polishing finish can be achieved.

Crockmeter Test

Crockmeter tests were performed according to DIN 55654.

CAM 180 Test

The cured coated steel panels were exposed to UV radiation and wet-dry cycling in the so-called CAM 180 test (according to SAE J2527_Sep17). The coatings were examined for the occurrence of cracks. The time at which first cracks were observed is shown in table 2.

TABLE 2

| Technology performance evaluation Refinish built-up. | | | | | | | | | |
|---|---|---|---|---|---|---|---|---|---|
| | Coating Compositions | | | | | | | | |
| Test methods | 1 | 2 | 3 | 4 | 5 | 6 | 7 | A | B |
| Tack free time/min | 15 | 30 | 30 | 30 | 15 | 30 | 30 | 60 | 60 |
| Xylene test 7 days after application | 1 | 0 | 0 | 2 | 0 | 0 | 0 | 0 | 0 |
| Cross-cut adhesion 7 days after application | 1 | 1 | 2 | 0 | 3 | 1 | 1 | 4 | 4 |
| Adhesion after constant climate test | yes | CD[1] | CD[1] | yes | CD[1] | CD[1] | yes | CD[1] | * |
| Cross-cut adhesion 24 h after constant climate | 2 | 5 | 5 | 5 | 5 | 5 | 3 | 5 | * |
| Comment on appearance | C[2] | C[2] | C[2] | C[2] | C[2] | C[2] | C[2] | C[2] | S[3] |
| Sandability after/min | 50 | | | | | | | 80 | |
| Polishability after/min | 50 | | | | | | | 80 | |

TABLE 2-continued

Technology performance evaluation Refinish built-up.

| | Coating Compositions | | | | | | | | |
|---|---|---|---|---|---|---|---|---|---|
| Test methods | 1 | 2 | 3 | 4 | 5 | 6 | 7 | A | B |
| Scratch resistance/crock meter (% residual gloss after sanding with 2 µm sanding disc) | 99 | | | | | | 99 | | |
| Weathering (CAM 180)/h | 2000 | | | | | | >2000 | | |

[1]CD = complete delamination
[2]C = clear
[3]S = structured
* constant climate test was not performed, because of the weak adhesion in cross-cut adhesion test 7 days after application.

All inventive Coating Compositions 1 to 7 show a fast curing to "dry touch" within 30 min, while the Comparative Coating Compositions A (prior art resin from EP 2 641 925 A1) and B (only catalyst (B2) used) need 60 min to "dry touch".

The cross-cut adhesion 7 days after application and curing clearly shows an excellent to acceptable performance of the Inventive Coating Compositions 1 to 7, while Comparative Coating Compositions A and B are not acceptable. Coating Composition making use of catalyst (B1), only, shows good results in this test.

The combination of catalysts (B1) and (B2) typically leads to a further improvement of the cross-cut adhesion 7 days after application and curing.

Best overall results are shown for Inventive Coating Compositions 1, 4 and 7 (containing epoxy silanes) having further good adhesion results after constant climate test.

Outstanding performance in the CAM 180 weathering test are found for Inventive Coating Compositions 1 and 7, making use of a combination of catalysts (B1) and (B2) and an epoxy silane. Cracking was not observed after 2000 h.

Furthermore, Inventive Coating Compositions 1 and 7 were sandable and polishable after 50 and 80 minutes, respectively. In general, curing times up to 90 minutes are accepted by refinish bodyshops for ambient curing clear-coats.

Inventive Coating Composition 1 was further examined for the appearance, leveling and gloss as shown in table 1 and passed typical requirements. The appearance was determined by using the measuring devices Wave-Scan Dual and Micro-Haze Plus manufactured and distributed by BYK Gardner.

TABLE 3

Surface properties of Coating Composition 1

| Test method | | Coating Composition 1 |
|---|---|---|
| Appearance | DOI | 75.2 |
| | du | 28.9 |
| Leveling | Long Wave | 12.0 |
| | Short Wave | 44.8 |
| Gloss/Haze | Gloss | 84.0 |
| | Haze | 23.4 |

Application of the Coatings in an OEM-Built-Up

Electro-coated panels were coated with a standard OEM filler (commercially available from BASF Coatings GmbH) and cured at 155° C. for 20 min after a flash-off of 5 min at 70° C. Afterwards a black standard OEM basecoat (commercially available from BASF Coatings GmbH) was applied, flash-off occurred at 80° C. for 10 minutes followed by application of Coating Composition 7 and 10 min flash-off at room temperature followed by curing for 20 min at 140° C.

| Coating layer | Thickness/µm |
|---|---|
| Filler | 35 |
| Base coat | 20 |
| Clear coat | 32 |

Testing of the Coating Obtained from Coating Composition 7

Cross-Cut Adhesion

Cross-cut adhesion test was performed according to DIN EN ISO 2409 EN.

Stone-Chip Test

Stone-Chip resistance test was performed according to DIN EN ISO 20567-1 EN and DIN EN ISO 21227-2 EN.

Steam-Jet Test

Steam-Jet Adhesion was performed according to DIN 55662 DE.

The appearance was determined by using the measuring devices Wave-scan dual and micro-haze plus manufactured and distributed by BYK Gardner.

TABLE 4

Technology performance evaluation OEM built-up.

| Test method | | Coating Composition 7 |
|---|---|---|
| Adhesion | Cross-cut adhesion 7 days after application | 0 |
| | Stone chip | 2 |
| | Steam jet | 0 |
| Appearance | Comment on appearance | Clear |
| | DOI | 79.5 |
| | Du | 25.9 |
| Leveling | Long wave | 7.4 |
| | Short wave | 29.9 |
| Gloss/Haze | Gloss | 87.9 |
| | Haze | 26.8 |

A very good performance in steam jet and cross-cut adhesion was determined. The adhesion after stone chip test is on an acceptable scale regarding OEM clear coatings. And the visual appearance measurement revealed that no incompatibilities between standard basecoat chemistry and novel isocyanate-free silane-based crosslinking chemistry are present.

The invention claimed is:

1. A coating composition comprising
(A) one or more resins of formula (I)

$$R—[NH—CO—NR^1—R^2—Si(R^a)_{3-x}(R^b)_x]_y \qquad (I)$$

wherein:

R is an aliphatic hydrocarbyl group, optionally containing one or more moieties selected from the group consisting of isocyanurate groups, uretdione groups, iminooxadiazinedione groups, allophanate groups and biuret groups;

$R^1$ is an alkyl group containing 1 to 10 carbon atoms, $R^2$ is an alkylene group containing 1 to 6 carbon atoms, $R^a$ is an alkoxy group containing 1 to 4 carbon atoms, $R^b$ is an alkyl group containing 1 to 4 carbon atoms or an alkoxy group containing 1 to 4 carbon atoms, x is 0 or 1, and y is 2 to 5; and wherein the one or more resins of formula (I) have an NCO content of 0%;

(B) one or more catalysts of formula (II)

$$z[H_3C—C(R^c)(R^d)—C(=O)—O^-]M^{z+} \qquad (II)$$

wherein $R^c$ and $R^d$ independently are hydrogen or alkyl groups containing 1 to 6 carbon atoms, with the proviso that the sum of the number of carbon atoms in residues $R^c$ and $R^d$ ranges from 2 to 7; and z=1 to 4; with the proviso that, if z=1, then M is selected from the group consisting of Li, K and Na;

if z=2, then M is selected from the group consisting of Zn and Zr;

if z=3, then M is selected from the group consisting of Bi and Al;

if z=4, then M is selected from the group consisting of Zr and Ti; and (C) one or more aprotic organic solvents.

2. The coating composition according to claim 1, characterized in that in formula (I)

R is selected from the group consisting of a diisocyanate from which the isocyanate groups were formally subtracted or its oligomers from which the isocyanate groups were formally subtracted, and/or $R^1$ is an alkyl group containing 2 to 8 carbon atoms, and/or $R^2$ is an alkylene group containing 1 to 3 carbon atoms, and/or $R^a$ is an alkoxy group containing 1 to 3 carbon atoms, and/or $R^b$ is a methyl group or an alkoxy group having 1 or 2 carbon atoms, and/or x=0, and/or y=2 to 4.

3. The coating composition according to claim 1, characterized in that in formula (II) the sum of the number of carbon atoms in residues $R^c$ and $R^d$ ranges from 5 to 7 and/or z=1 or 3.

4. The coating composition according to claim 1, characterized in that the one or more catalysts of formula (II) are the neodecanoates and/or ethylhexanoates of potassium or lithium.

5. The coating composition according to claim 1, characterized in that the one or more aprotic organic solvents (C) are selected from the group consisting of aliphatic and/or aromatic hydrocarbons, ketones, esters, and mixtures of the afore-mentioned solvents.

6. The coating composition according to claim 1, characterized in that it further comprises one or more catalysts (B2) selected from the group consisting of bicyclic tertiary amines.

7. The coating composition according to claim 1, characterized in that it further comprises one or more carboxylic acids (D) of formula (III)

$$H_3C—C(R^e)(R^f)—C(=O)—OH \qquad (III)$$

wherein $R^e$ and $R^f$ independently are hydrogen or alkyl groups containing 1 to 6 carbon atoms, with the proviso that the sum of the number of carbon atoms in residues $R^e$ and $R^f$ ranges from 2 to 7.

8. The coating composition according to claim 1, characterized in that it further comprises one or more epoxy functional compounds (E) of formula (IV)

$$(X)_n—R^3—Ox \qquad (IV)$$

wherein Ox is an oxirane group; $R^3$ is an aliphatic hydrocarbyl group containing 2 to 15 carbon atoms and optionally comprising ether groups and/or ester groups; n=1 to 5; and the n X groups are independently of each other Ox or —$Si(R^g)_{3-v}(R^h)_v$, wherein v=0 or 1, $R^g$ is an alkoxy group containing 1 to 4 carbon atoms, and $R^h$ is an alkyl group containing 1 to 4 carbon atoms or an alkoxy group containing 1 to 4 carbon atoms.

9. The coating composition according to claim 1, characterized in that it further contains one or more coating additives (F).

10. The coating composition according to claim 1, comprising 25 to 95 wt.-% of the (A) one or more resins of formula (I), based on the total weight of the coating composition;

1 to 50 mmol of the (B) one or more catalysts of formula (II) per 100 g of (A);

1 to 70 wt.-% of the (C) one or more aprotic solvents, based on the total weight of the coating composition;

0 to 80 wt.-% of (D) one or more carboxylic acids of formula (III)

$$H_3C—C(R^e)(R^f)—C(=O)—OH \qquad (III)$$

wherein $R^e$ and $R^f$ independently are hydrogen or alkyl groups containing 1 to 6 carbon atoms, with the proviso that the sum of the number of carbon atoms in residues $R^e$ and $R^f$ ranges from 2 to 7, based on the total weight of (B);

0 to 20 wt.-% of (E) one or more epoxy functional compounds of formula (IV)

$$(X)_n—R^3—Ox \qquad (IV)$$

wherein Ox is an oxirane group; $R^3$ is an aliphatic hydrocarbyl group containing 2 to 15 carbon atoms and optionally comprising ether groups and/or ester groups; n=1 to 5; and the n X groups are independently of each other Ox or —$Si(R^8)_{3-v}(R^h)_v$, wherein v=0 or 1, $R^g$ is an alkoxy group containing 1 to 4 carbon atoms, and $R^h$ is an alkyl group containing 1 to 4 carbon atoms or an alkoxy group containing 1 to 4 carbon atoms, based on the solids content of the coating composition;

0 to 20 wt.-% of (F) one or more coating additives; and, if present, catalyst (B2) in a weight ratio of (B) to (B2) being from 1:1 to 8:1.

11. The coating composition of claim 1, characterized in that it is a clearcoat composition.

12. A method of coating a substrate with a coating composition, the method comprising a. applying a coating composition as defined in claim 1 onto a substrate to form a coating layer; and b. curing the coating layer at a temperature in the range from 10° C. to 180° C.

13. A coated substrate obtained according to the method of claim 12.

14. The coated substrate according to claim 13, characterized in that the substrate is selected from the group consisting of bodies of means of transportation or parts thereof; interior or exterior constructions; furniture; windows; doors; plastics moldings; small industrial parts; coils; containers; packaging; white goods; sheets; optical, electrical and mechanical components; glassware; and articles of everyday use.

15. A multilayer coating comprising at least two coating layers, wherein at least one of the coating layers is formed from a coating composition according to claim 1.

16. A substrate coated with a multilayer coating as defined in claim 15.

* * * * *